(12) United States Patent
Urashima

(10) Patent No.: US 8,861,857 B2
(45) Date of Patent: Oct. 14, 2014

(54) IMAGE PROCESSING APPARATUS AND IMAGE PROCESSING METHOD

(75) Inventor: Hiroki Urashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 12/498,129

(22) Filed: Jul. 6, 2009

(65) Prior Publication Data

US 2010/0008570 A1    Jan. 14, 2010

(30) Foreign Application Priority Data

Jul. 8, 2008    (JP) .................................. 2008-178404

(51) Int. Cl.
*G06K 9/00* (2006.01)
*H04N 1/387* (2006.01)
*G06T 11/60* (2006.01)

(52) U.S. Cl.
CPC .............. *G06T 11/60* (2013.01); *H04N 1/3875* (2013.01)
USPC ............................ 382/181; 382/118; 382/162

(58) Field of Classification Search
None
See application file for complete search history.

(56) References Cited

U.S. PATENT DOCUMENTS

| | | | | |
|---|---|---|---|---|
| 7,822,233 B2* | 10/2010 | Nagaoka et al. | ............... | 382/118 |
| 8,055,080 B2* | 11/2011 | Isomura et al. | ............... | 382/224 |
| 8,064,710 B2* | 11/2011 | Mizoguchi | .................... | 382/233 |
| 8,086,612 B2* | 12/2011 | Matsushita et al. | ........... | 707/752 |
| 8,098,896 B2* | 1/2012 | Isomura et al. | ............... | 382/106 |
| 8,122,356 B2* | 2/2012 | Lawther et al. | ............... | 715/716 |
| 8,166,391 B2* | 4/2012 | Kaneko | ......................... | 715/247 |
| 2002/0168108 A1* | 11/2002 | Loui et al. | ..................... | 382/190 |
| 2003/0194148 A1* | 10/2003 | Haeberli | ...................... | 382/283 |
| 2005/0105806 A1* | 5/2005 | Nagaoka et al. | .............. | 382/224 |
| 2006/0050337 A1 | 3/2006 | Hitaka et al. | | |
| 2006/0056737 A1* | 3/2006 | Ohtsuka et al. | ............... | 382/305 |
| 2006/0078201 A1* | 4/2006 | Kim et al. | ..................... | 382/181 |
| 2006/0170704 A1 | 8/2006 | Kotani et al. | .................. | 345/619 |
| 2006/0204135 A1* | 9/2006 | Funakura | ...................... | 382/291 |
| 2006/0220983 A1* | 10/2006 | Isomura et al. | ................ | 345/1.1 |
| 2006/0221779 A1* | 10/2006 | Matsushita et al. | ........ | 369/30.01 |
| 2007/0076960 A1 | 4/2007 | Takamori et al. | | |
| 2008/0028298 A1* | 1/2008 | Kaneko | ......................... | 715/243 |
| 2008/0049976 A1* | 2/2008 | Isomura et al. | ............... | 382/106 |
| 2008/0075338 A1* | 3/2008 | Muramatsu et al. | .......... | 382/118 |
| 2008/0089590 A1* | 4/2008 | Isomura et al. | ............... | 382/217 |
| 2008/0107331 A1* | 5/2008 | Kojima et al. | ................ | 382/162 |

FOREIGN PATENT DOCUMENTS

| | | |
|---|---|---|
| JP | 2002-216165 A | 8/2002 |
| JP | 2004-173158 A | 6/2004 |
| JP | 2004-272314 A | 9/2004 |

(Continued)

OTHER PUBLICATIONS

Chinese Office Action dated Dec. 16, 2010 for Application No. 200910158517.2.

(Continued)

*Primary Examiner* — Sean Motsinger
(74) *Attorney, Agent, or Firm* — Canon USA, Inc. IP Division

(57) ABSTRACT

In order to prevent an image print and/or an image view from being visually monotonous, if it is determined that there is a similarity between similarity determination target images arranged in a specific area in an album, image processing is performed upon both or either of these similarity determination target images so as to eliminate the similarity between these similarity determination target images.

21 Claims, 13 Drawing Sheets

(56) References Cited

FOREIGN PATENT DOCUMENTS

| | | | |
|---|---|---|---|
| JP | 2005-216160 | A | 8/2005 |
| JP | 2005-259173 | A | 9/2005 |
| JP | 2007-019894 | A | 1/2007 |
| JP | 2007-028137 | A | 2/2007 |
| JP | 2007-097090 | A | 4/2007 |
| JP | 2007-206751 | A | 8/2007 |
| JP | 2007-249434 | A | 9/2007 |
| JP | 2007-272685 | A | 10/2007 |
| JP | 2007-312058 | A | 11/2007 |
| WO | 2006/098417 | A | 9/2006 |

OTHER PUBLICATIONS

Dave Grosvenor, "The use of a cast to generate person-biased photo-albums", Research Disclosure, Mason Publications, Hampshire, GB, vol. 509, No. 64, Sep. 1, 2006.

Dave Grosvenor and Susanne Klein, "The use of a cast to generate person-biased video presentations", Research Disclosure, Mason Publications, Hampshire, GB, vol. 509, No. 62., Sep. 1, 2006.

Geigel J, Loui A, "Automatic Page Layout Using Genetic Algorithms for Electronic Albuming", SPIE Proceedings, The International Society for Optical Engineering-SPIE, Bellingham, Washington, USA, vol. 4311, Jan. 1, 2002.

* cited by examiner

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

In current years, it is possible to easily capture images using digitalized apparatuses such as digital cameras. It is common to print captured images as an album and distribute the album.

As a result of easy image capturing, many similar images are captured. Accordingly, when an image print medium or an image view, for example, an album or an image list, is created so as to allow a user to view captured images, similar photographs are often arranged in the image print medium or the image view. The image print medium or the image view is therefore visually monotonous. Japanese Patent Laid-Open No. 2007-019894 discloses a method of arranging similar images at positions apart from each other in the same page so as to prevent the page from being visually monotonous.

However, if the arrangement of images is changed using the above-described method, these images that are arranged in an order desired by a user are rearranged in an order undesired by the user.

SUMMARY OF THE INVENTION

The present invention provides an image processing apparatus and an image processing method capable of preventing an image print and/or an image view from being visually monotonous.

According to an embodiment of the present invention, there is provided an image processing apparatus including: a determination unit configured to determine whether there is a similarity between images arranged in a specific area in an album; and an image processing unit configured to perform image processing upon both or either of the images so as to eliminate the similarity between the images which has been determined by the determination unit.

According to an embodiment of the present invention, there is provided an image processing method including: determining whether there is a similarity between images arranged in a specific area in an album; and performing image processing upon both or either of the images so as to eliminate the similarity between the images.

According to an embodiment of the present invention, there is provided a computer-readable storage medium storing computer-executable instructions for: determining whether there is a similarity between images arranged in a specific area in an album; and performing image processing upon both or either of the images so as to eliminate the similarity between the images.

According to an embodiment of the present invention, it is possible to an image print and/or an image view from being visually monotonous.

Further features of the present invention will become apparent from the following description of exemplary embodiments with reference to the attached drawings.

DESCRIPTION OF THE EMBODIMENTS

Embodiments of the present invention will be described with reference to the accompanying drawings.

Figure 1:
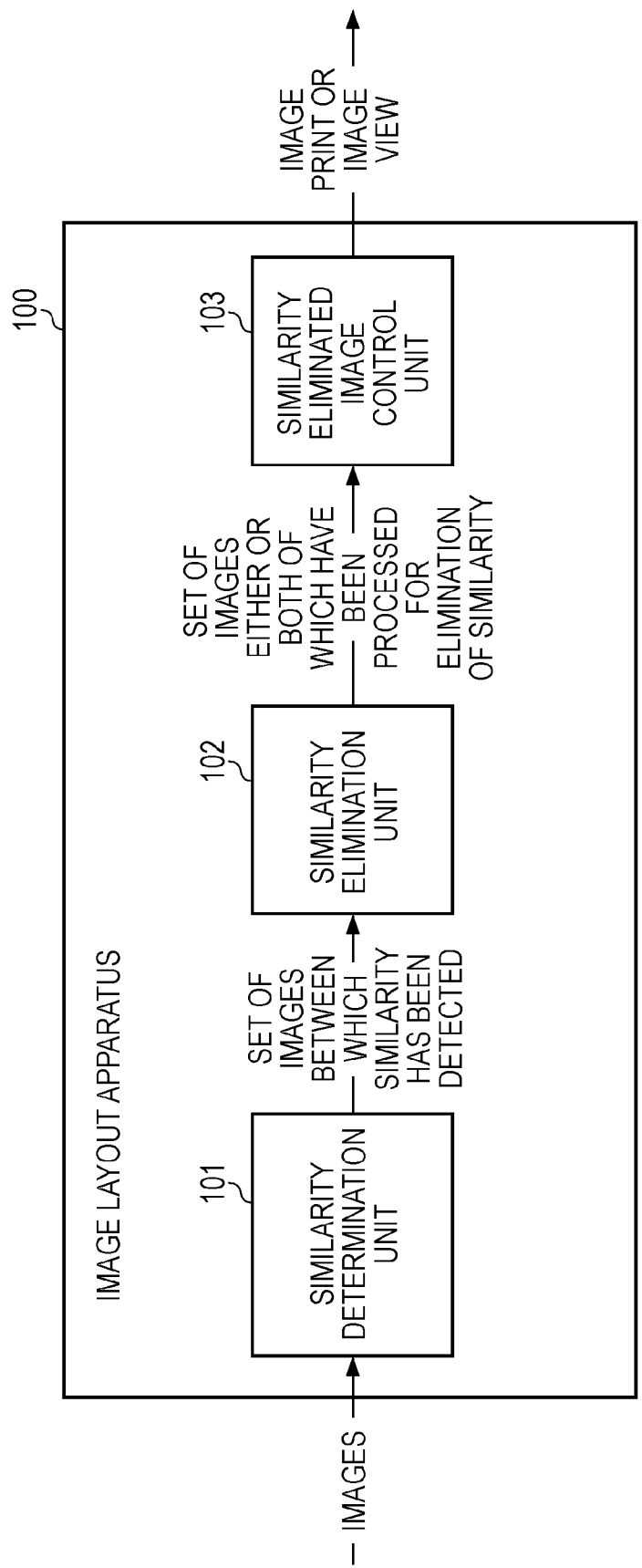
FIG. 1 is a diagram illustrating an exemplary functional configuration of an image layout apparatus that is an example of an image processing apparatus.

FIG. 1 is a diagram illustrating an exemplary functional configuration of an image layout apparatus that is an example of an image processing apparatus. An image layout apparatus 100 includes a similarity determination unit 101, a similarity elimination unit 102, and a similarity eliminated image control unit 103. The similarity determination unit 101 sets images (similarity determination target images) to be compared with each other on the basis of the order of inputting images and the locations of these images and determines whether there is a similarity between these images. The similarity elimination unit 102 processes both or either of images that have been determined to be similar to each other by the similarity determination unit 101 so that these images are no longer similar to each other. The similarity eliminated image control unit 103 performs control processing upon a part of an image which has been changed by the similarity elimination unit 102.

Figure 2:
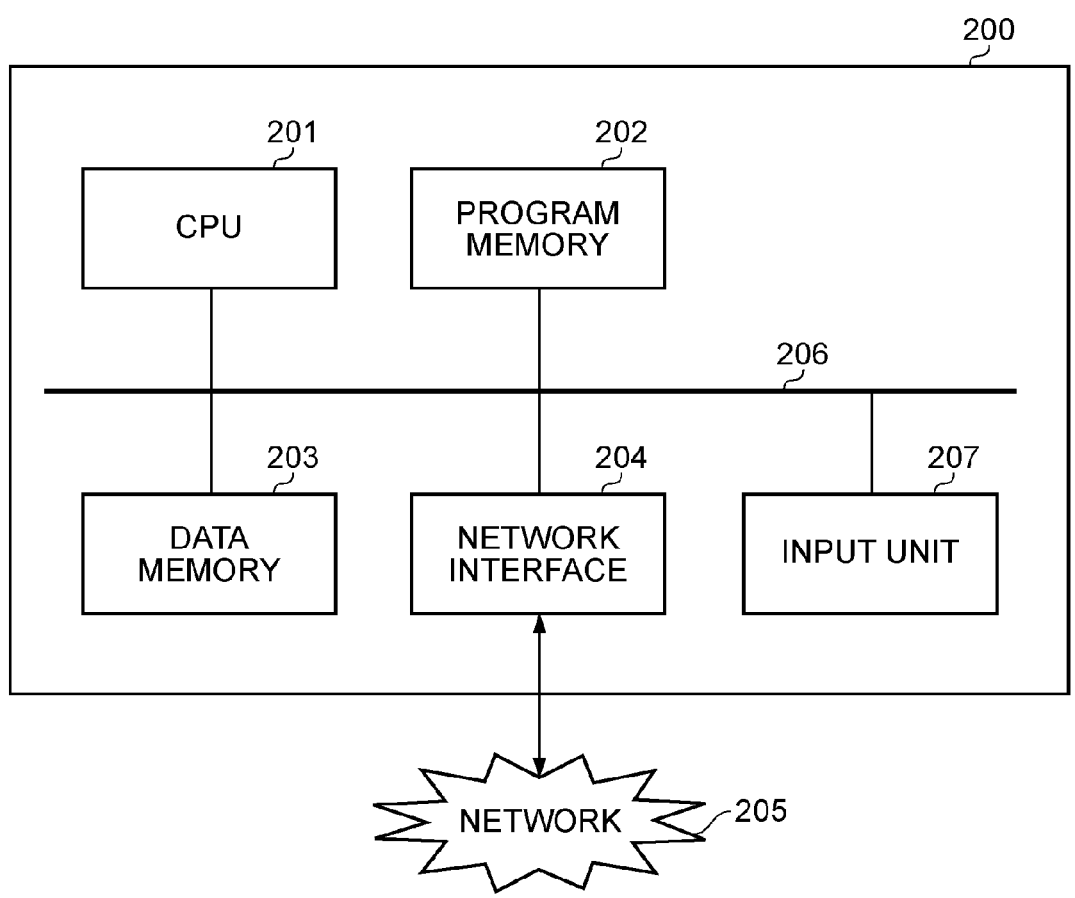
FIG. 2 is a diagram illustrating an exemplary hardware configuration of an image layout apparatus.

FIG. 2 is a diagram illustrating an exemplary hardware configuration of an image layout apparatus. A CPU 201 performs computation, logical decision, etc. for various pieces of processing, and controls various components connected to a bus 206. An image layout apparatus includes memories including a program memory 202 and a data memory 203. The program memory 202 stores a program. If the CPU 201 performs processing in accordance with the program stored in the program memory 202, the above-described functions or processes corresponding to flowcharts to be described later are performed.

The program memory 202 may be a ROM or a RAM into which a program is loaded from an external storage apparatus or the like. A network I/F 204 communicates with another apparatus via a network 205. Image data may be input into the image layout apparatus from another apparatus via the network, and may be output to another apparatus via the network. An input unit 207 is used to input information (data), and may be a keyboard, a mouse, or an input unit sensitive to pressure applied by a pen or finger.

Figure 3:
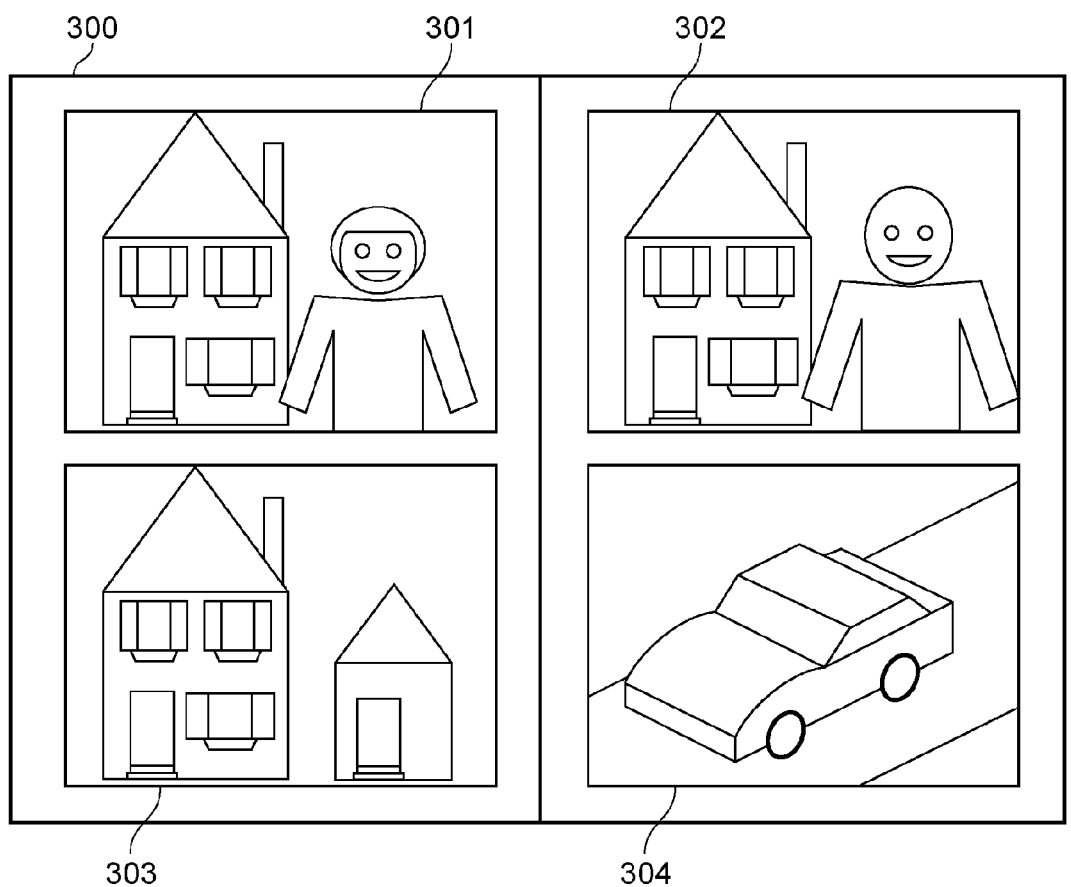
FIG. 3 is a diagram illustrating an exemplary image layout in which images are arranged in a desired order.

FIG. 3 is a diagram illustrating an exemplary image layout 300 in which images are arranged in a desired order. In the image layout 300, images 301 and 303 are vertically arranged on one page and images 302 and 304 are vertically arranged on another page. An image layout is not limited to the image layout illustrated in FIG. 3. If images are arranged in the order of inputting these images, the number of images included in each page may not be two and may vary from page to page. The input images may be still images or moving images. If moving images are input, the image layout apparatus 100 may display these moving images, frames cut out from these moving images as still images, or images representing these moving images.

Figure 4:
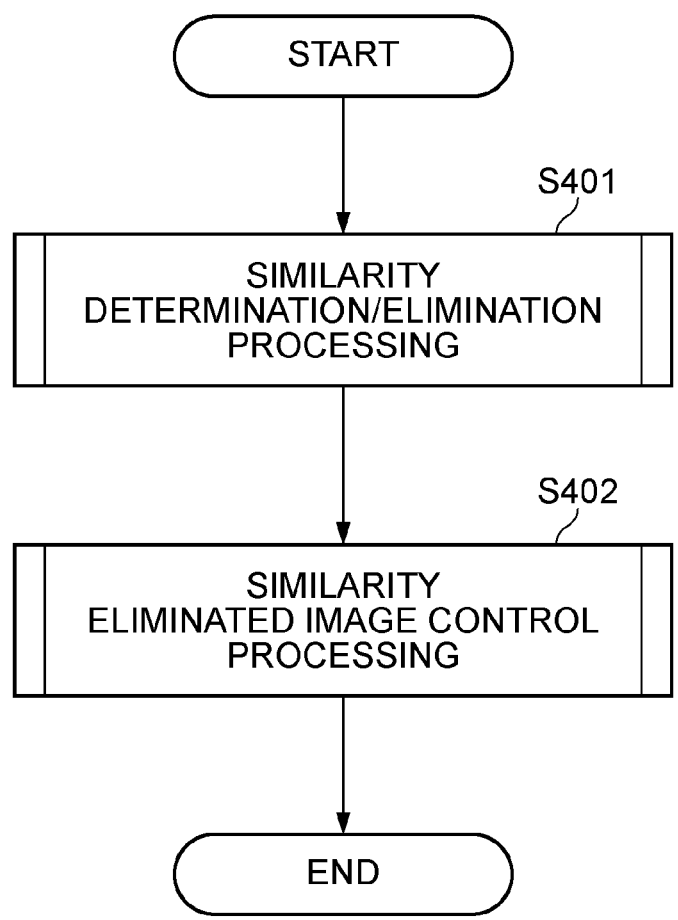
FIG. 4 is a flowchart illustrating an example of a process performed by an image layout apparatus.

FIG. 4 is a flowchart illustrating an example of a process performed by the image layout apparatus 100. In step S401, the similarity determination unit 101 determines whether there is a similarity between input images and the similarity elimination unit 102 performs processing for eliminating the similarity. In step S402, the similarity eliminated image control unit 103 performs processing for controlling images from which the similarity has been eliminated.

Figure 5:
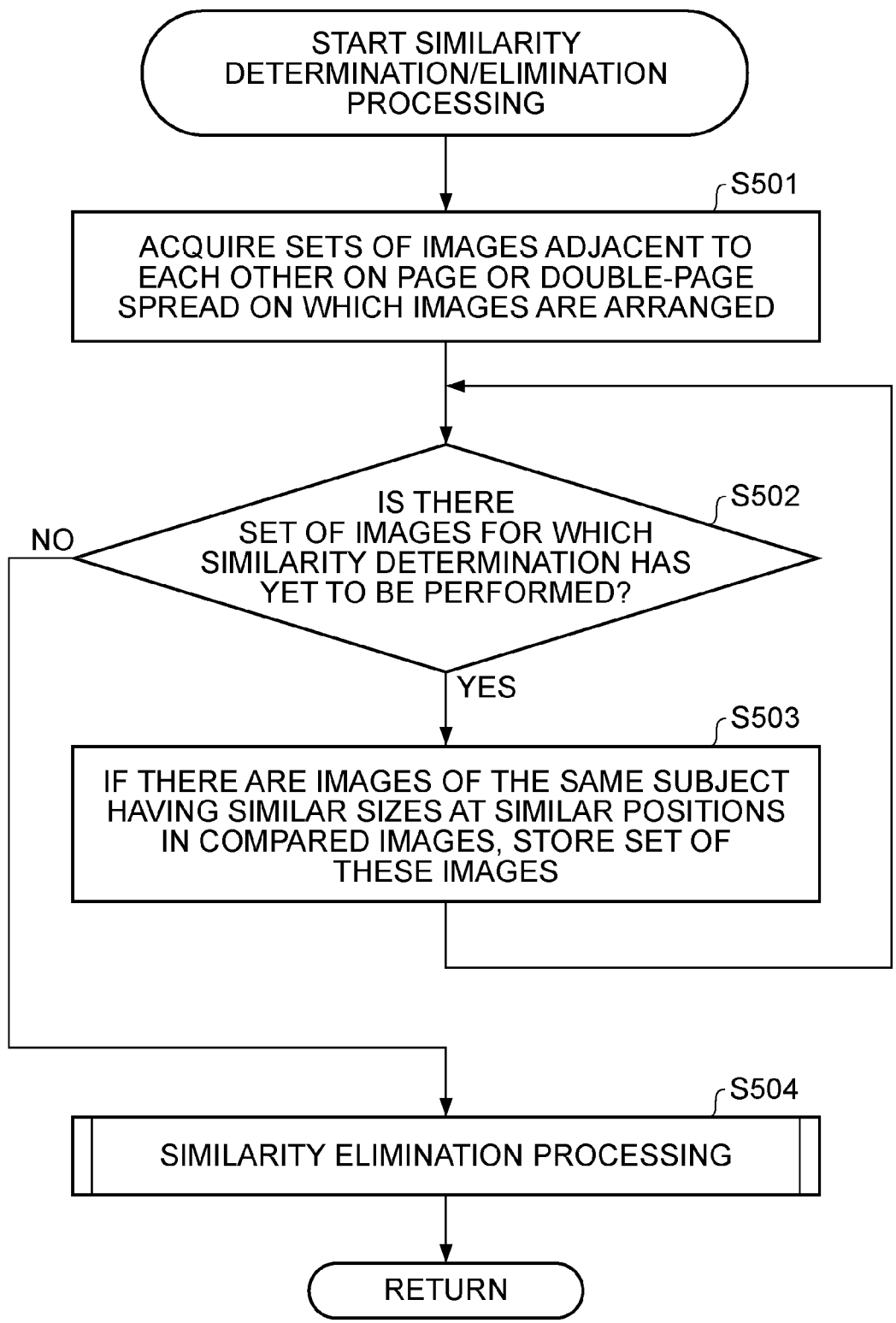
FIG. 5 is a flowchart illustrating details of similarity determination/elimination processing according to a first embodiment.

Similarity determination/elimination processing performed in step S401 will be described with reference to FIG. 5. FIG. 5 is a (first) flowchart illustrating details of the similarity determination/elimination processing performed in step S401. In step S501, the similarity determination unit 101 selects images adjacent to each other from among arranged images as images to be compared with each other. In the image layout illustrated in FIG. 3, the similarity determination unit 101 selects a set of the images 301 and 302, a set of images 301 and 303, a set of images 302 and 304, and a set of images 303 and 304.

In step S502, the similarity determination unit 101 determines whether there is a set of images for which similarity determination has yet to be performed among the selected sets of images. If the similarity determination unit 101 determines in step S502 that there is a set of images for which similarity determination has yet to be performed among the selected sets of images, the process proceeds to step S503. If the similarity determination unit 101 determines in step S502 that there is no set of images for which similarity determination has yet to be performed among the selected sets of images, the process proceeds to step S504.

In step S503, the similarity determination unit 101 compares two images included in the selected set of images so as to determine whether there are the images of the same subject having similar sizes at similar positions in the two images, and stores in the data memory 203 the set of the two images determined to include the images of the same subject having similar sizes at similar positions. Subsequently, the process returns to step S502. The similarity determination unit 101 recognizes a subject using a subject detection technique and a subject recognition technique. In particular, if a subject is a person, the similarity determination unit 101 may detect and recognize the face of the person. For example, the similarity determination unit 101 detects a subject from an image, recognizes the detected subject, and specifies the position, size, and type (for example, a building or a person) of the recognized subject in the image. The similarity determination unit 101 compares two subjects included in similarity determination target images, and determines that the two subjects are present at similar positions in the similarity determination target images when an error between the positions of the two subjects in the similarity determination target images is within a predetermined error limit. Furthermore, the similarity determination unit 101 compares the two subjects included in the similarity determination target images, and determines that the two subjects have similar sizes when an error between the sizes of the two subjects in the similarity determination target images is within a predetermined error limit.

For example, the similarity determination unit 101 determines that there is a similarity between the images 301 and 302 and a similarity between the images 301 and 303 in FIG. 3, since these are images of the same house having the same size (i.e. similar sizes within the error limit) on the left sides of these images. In step S504, the similarity elimination unit 102 performs similarity elimination processing upon the set of images stored in the data memory 203 in step S503. In other words, the image information regarding the house may be deleted from one of the images (301) because this information already exists in conjunction with the other image (302).

Figure 6:
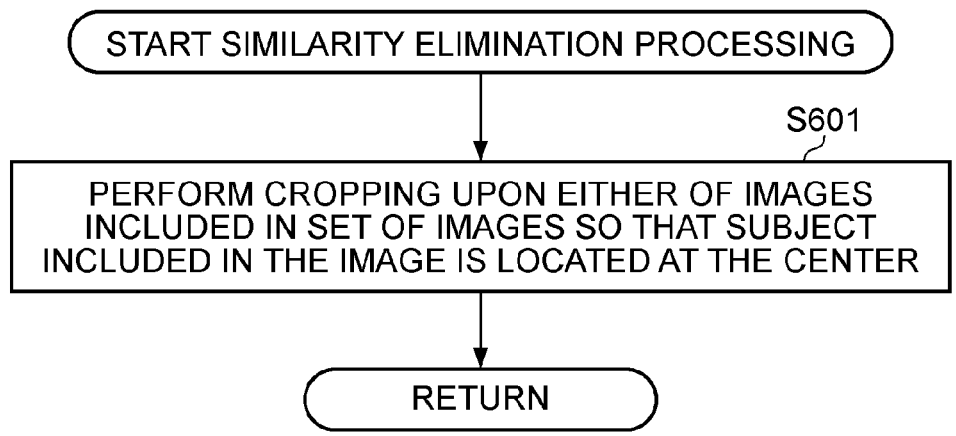
FIG. 6 is a flowchart illustrating details of similarity elimination processing.

Next, details of the similarity elimination processing performed in step S504 will be described with reference to a flowchart illustrated in FIG. 6. FIG. 6 is a flowchart illustrating details of the similarity elimination processing performed in step S504. In step S601, the similarity elimination unit 102 crops either of images included in each of the sets of images stored in the data memory 203 so that a subject included in the image is located at the center, thereby completing the similarity elimination processing. As a subject to be located at the center, the similarity elimination unit 102 preferentially selects a subject other than a subject that has been determined to be similar to a subject included in the other image.

If the same image redundantly appears in a plurality of sets of images between which a similarity has been detected, the similarity elimination unit 102 may preferentially process the image. In the first embodiment, in order to change the state of an image, the similarity elimination unit 102 crops the image so that a subject included in the image is located at the center. However, if a state in which the images of the same subject having similar sizes are not present at similar positions in images included in a set of the images can be achieved, image processing such as blurring or image inversion may be performed upon either of the images. If images included in a set of the images are moving images, the similarity elimination unit 102 may change either of displayed frames of the moving images. That is, the similarity elimination unit 102 may temporally shift either of displayed frames of the moving images.

In the first embodiment, the similarity elimination unit 102 performs image processing upon either of images that have been compared with each other. However, if a state in which the images of the same subject having similar sizes are not present at similar positions in the compared images can be achieved, the similarity elimination unit 102 may perform image processing upon both of the images. In order to differentiate between an image that has been subjected to image processing and an image that has not been subjected to image processing, the similarity elimination unit 102 may highlight the image that has been subjected to image processing by surrounding the image with a frame. For example, in step S601, the similarity elimination unit 102 preferentially performs image processing upon the image 301 that redundantly appears in the set of the images 301 and 302 between which a similarity has been detected in step S503 and the set of the images 301 and 303 between which a similarity has been detected in step S503. In the first embodiment, the similarity elimination unit 102 crops the image 301 so that a person included in the image 301 is located at the center.

Figure 7:
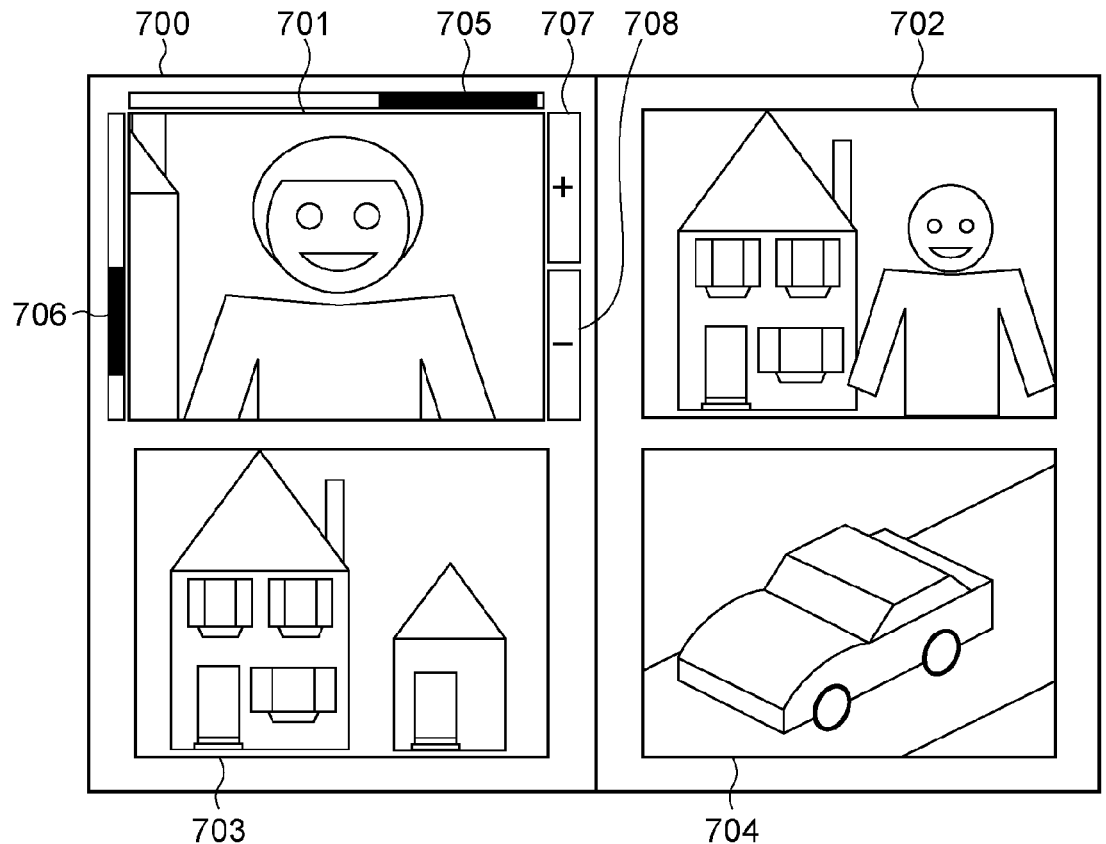
FIG. 7 is a diagram illustrating an exemplary image layout that has been subjected to the similarity elimination processing.

FIG. 7 is a diagram illustrating an exemplary image layout 700 that has been subjected to the similarity elimination processing. Images 701, 702, 703, and 704 included in the image layout 700 correspond to the images 301, 302, 303, and 304 illustrated in FIG. 3, respectively. The image 701 is obtained by performing cropping upon the image 301 so that a person included in the image 301 is located at the center. Slide bars 705 and 706 are configured to display the current display position of the image 701 that is an enlarged image and to receive a display position change instruction from the input unit 207. An enlargement button 707 and a reduction button 708 are configured to receive an instruction for changing the scaling factor of the image 701 so as to allow a user to enlarge and reduce the image 701, respectively.

Figure 8:
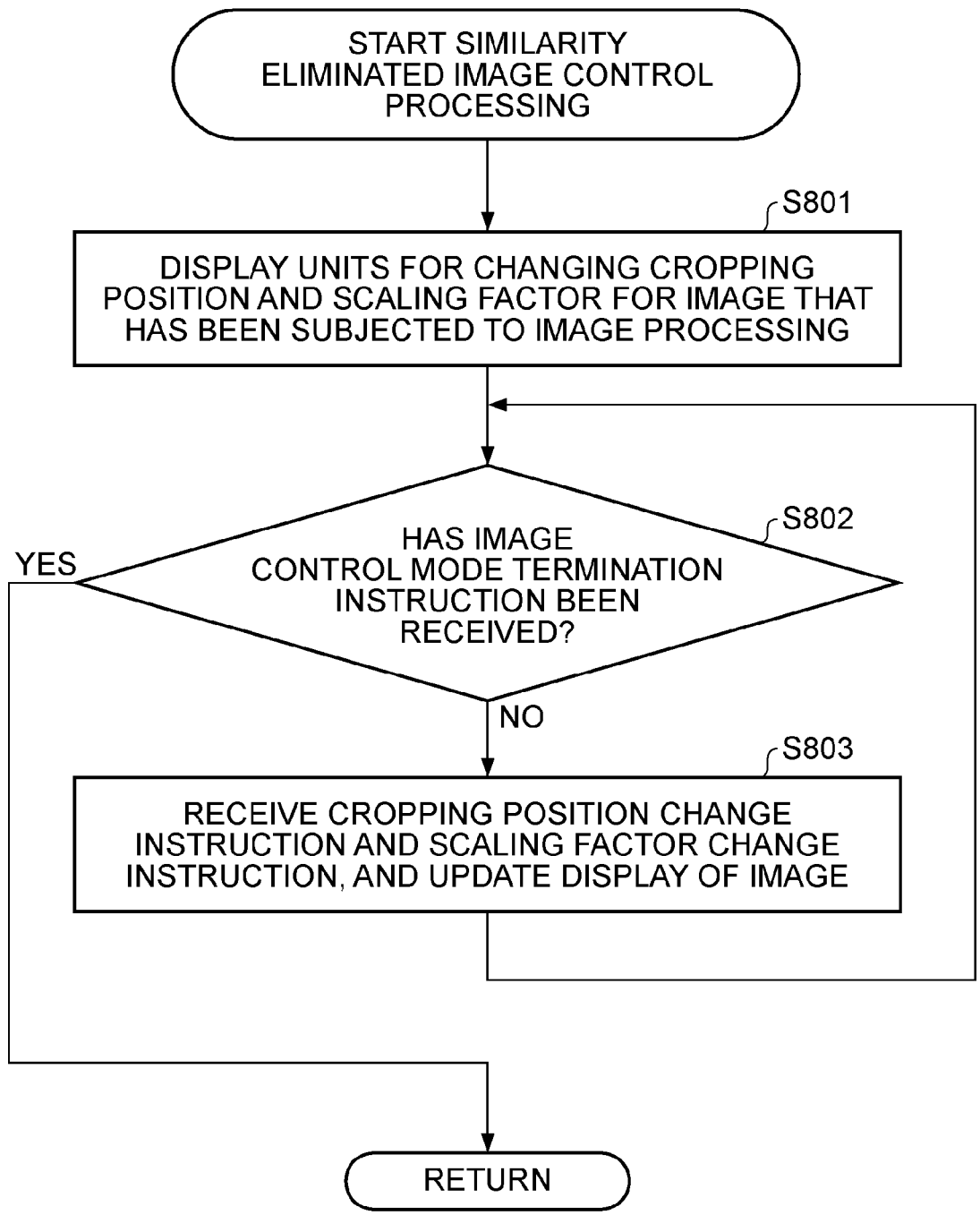
FIG. 8 is a flowchart illustrating details of similarity eliminated image control processing according to a first embodiment.

Next, details of the similarity eliminated image control processing performed in step S402 will be described with reference to a flowchart illustrated in FIG. 8. FIG. 8 is a (first) flowchart illustrating details of the similarity eliminated image control processing performed in step S402. In step S801, the similarity eliminated image control unit 103 enters an image control mode in which image processing control units for controlling image processing for an image that has been subjected to image processing in the similarity elimination processing are displayed. The image processing control units correspond to the slide bars 705 and 706, the enlargement button 707, and the reduction button 708.

In step S802, if the similarity eliminated image control unit 103 receives an image control mode termination instruction, the similarity eliminated image control processing is terminated. On the other hand, in step S802, if the similarity eliminated image control unit 103 does not receive the image control mode termination instruction, the process proceeds to step S803. In step S803, the similarity eliminated image control unit 103 receives instructions input by the image processing control units from the input unit 207, and updates the display of an image. Subsequently, the process returns to step S802. In an example illustrated in FIG. 7, the similarity eliminated image control unit 103 receives an image position change instruction input by the slide bars 705 and 706 and an image scaling factor change instruction input by the enlargement button 707 or the reduction button 708, and changes the position and scaling factor of the image.

Thus, according to the first embodiment, it is possible to prevent an image print and/or an image view from being visually monotonous by determining a similarity between images, processing both or either of the images, and eliminating the similarity between the images. Furthermore, according to the first embodiment, it is possible to provide an image print and/or an image view desired by a user by displaying an image that has been subjected to image processing and allowing the user to change the image.

Figure 9:
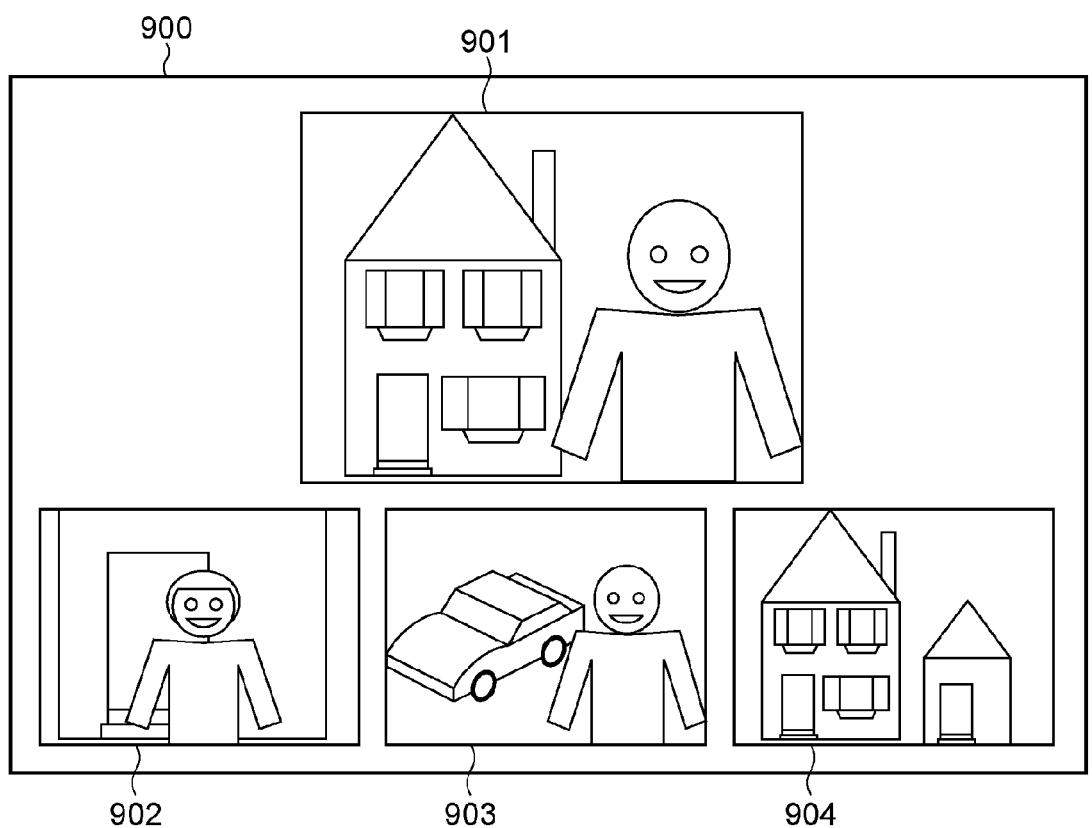
FIG. 9 is a diagram illustrating an exemplary image layout in which images that have been sequentially input are arranged in a desired order.

A second embodiment of the present invention will be described below. FIG. 9 is a diagram illustrating an exemplary image layout 900 in which images that have been sequentially input are arranged in a desired order. Images 901, 902, 903, and 904 that are included in the image layout 900 according to the second embodiment are arranged on a template. If these images are arranged in the order of inputting these images, these images may be sequentially arranged from the top of a page or the arrangement order of these images may be determined by a template.

Figure 10:
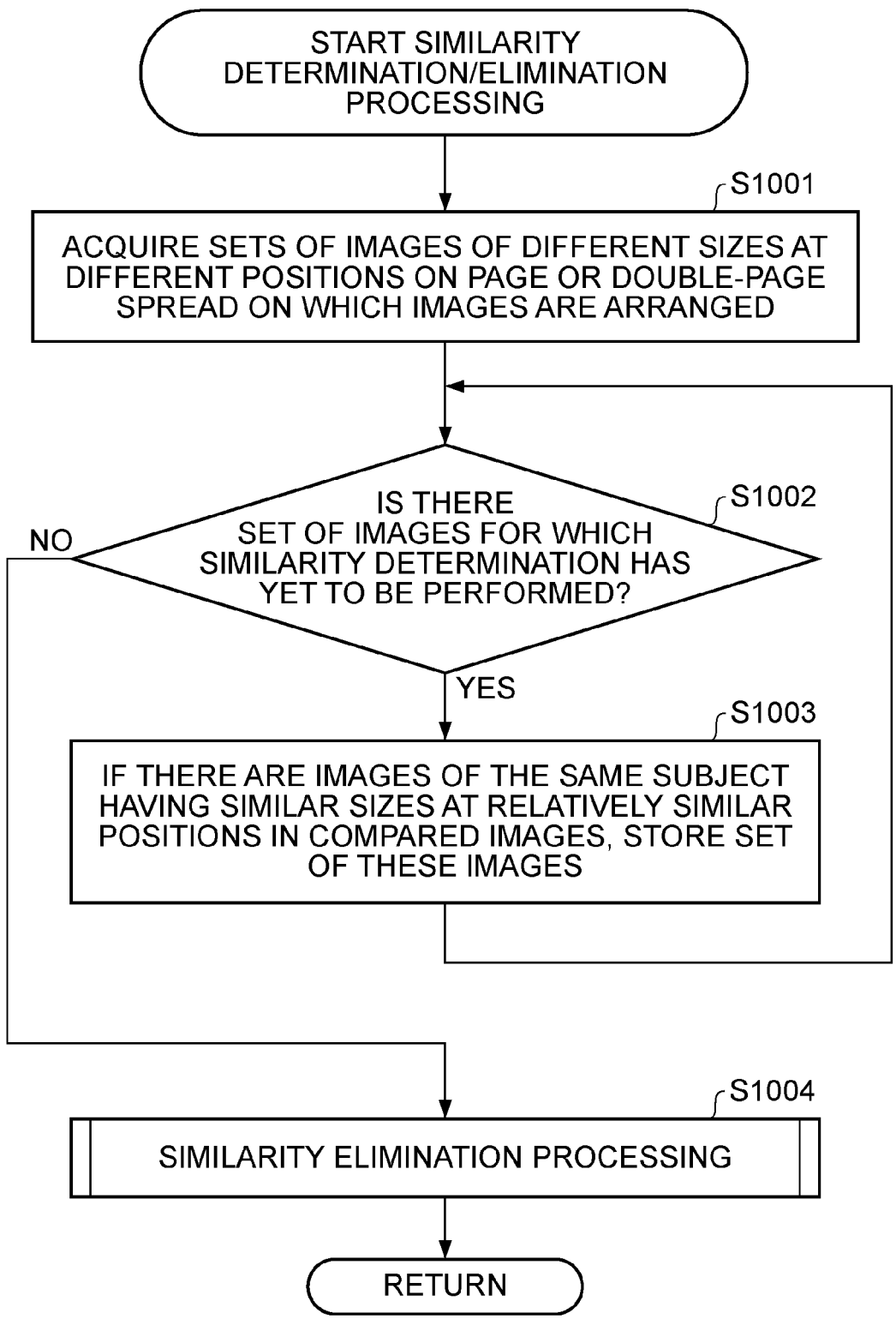
FIG. 10 is a flowchart illustrating details of the similarity determination/elimination processing according to a second embodiment.

The process performed by an image layout apparatus according to the second embodiment is the same as that performed by an image layout apparatus according to the first embodiment which is illustrated in FIG. 4 except for the similarity determination/elimination processing performed in step S401. Details of the similarity determination/elimination processing performed in step S401 will be described with reference to a flowchart illustrated in FIG. 10. FIG. 10 is a (second) flowchart illustrating the details of the similarity determination/elimination processing performed in step S401, but according to a second embodiment. In step S1001, the similarity determination unit 101 selects a main image included in a page or double-page spread and an image that is not the main image as images to be compared with each other. For example, the similarity determination unit 101 acquires (or selects) images of different display sizes included in a page or double-page spread on which images are arranged as images to be compared with each other.

In the image layout illustrated in FIG. 9, the similarity determination unit 101 selects the image 901 as a main image and the images 902, 903, and 904 as images to be compared with the image 901. The similarity determination unit 101 may compare not only images of different display sizes but also images having different attributes, images specified by a user, or images specified in advance by a template with each other.

In step S1002, the similarity determination unit 101 determines whether there is a set of images for which similarity determination has yet to be performed among the selected sets of images. If it is determined in step S1002 that there is a set of images for which similarity determination has yet to be performed, the process proceeds to step S1003. If it is determined in step S1002 that there is no set of images for which similarity determination has yet to be performed, the process proceeds to step S1004. In step S1003, the similarity determination unit 101 compares images included in each of the selected sets of images with each other. As a result of the comparison, if there are images of the same subject having similar sizes at relatively similar positions in the compared images, the similarity determination unit 101 stores the set of these images in the data memory 203. Subsequently, the process returns to step S1002.

In the image layout illustrated in FIG. 9, since there are images of the same person having similar sizes are present on the right sides of the images 901 and 903, it is determined that there is a similarity between the images 901 and 903. Since images of the same house having similar sizes are present on the left sides of the images 901 and 904, it is determined that there is a similarity between the images 901 and 904. In step S1004, the similarity elimination unit 102 performs similarity elimination processing upon the set of images stored in the data memory 203 in step S1003.

Figure 11:
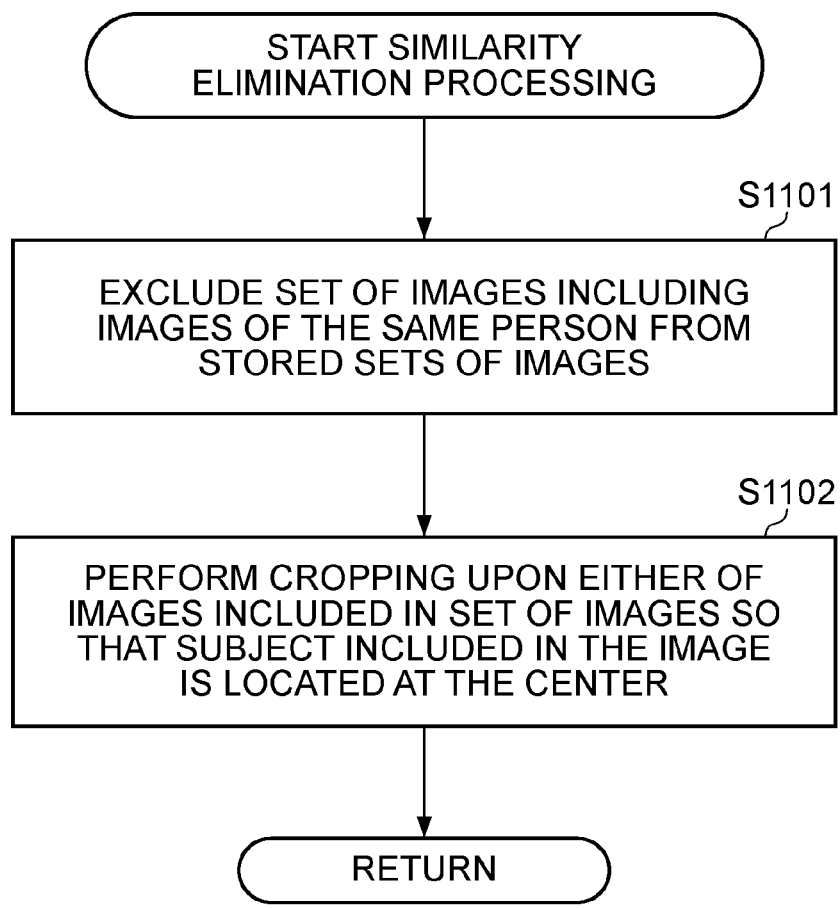
FIG. 11 is a flowchart illustrating details of similarity elimination processing.

Next, the similarity elimination processing performed in step S1004 will be described with reference to a flowchart illustrated in FIG. 11. FIG. 11 is a flowchart illustrating details of the similarity elimination processing performed in step S1004. In step S1101, the similarity elimination unit 102 excludes a set of images that have been determined to include the same person as the same subject at the time of similarity determination from the sets of images stored in the data memory 203. Subsequently, the process proceeds to step S1102.

In this embodiment, a case in which the similarity elimination unit 102 excludes all sets of images including the same person as the same subject from the sets of images stored in the data memory 203 will be described. However, the similarity elimination unit 102 may exclude only sets of images including a specific person determined in advance from the sets of images stored in the data memory 203. Since the images 901 and 903 that have been determined in step S1003 to be similar to each other include the same person as the same object, the set of the images 901 and 903 is excluded from the sets of images stored in the data memory 203. On the other hand, since the images 901 and 904 that have been determined in step S1003 to be similar to each other have the same house as the same object, the set of the images 901 and 904 is not excluded from the sets of images stored in the data memory 203. In other words, the repetition of objects in images may be treated differently, depending on the contents of previous images.

As in step S601 according to the first embodiment illustrated in FIG. 6, in step S1102, the similarity elimination unit 102 performs cropping upon either of images included in each of the sets of images stored in the data memory 203 so that a subject included in the image is located at the center. Subsequently, the similarity elimination processing ends. At the time of cropping, the similarity elimination unit 102 preferentially performs image processing upon an image of a relatively small display size. Accordingly, in step S1102, the similarity elimination unit 102 performs cropping upon the image 904 of a relatively small display size included in the set of the images 901 and 904.

Figure 12:
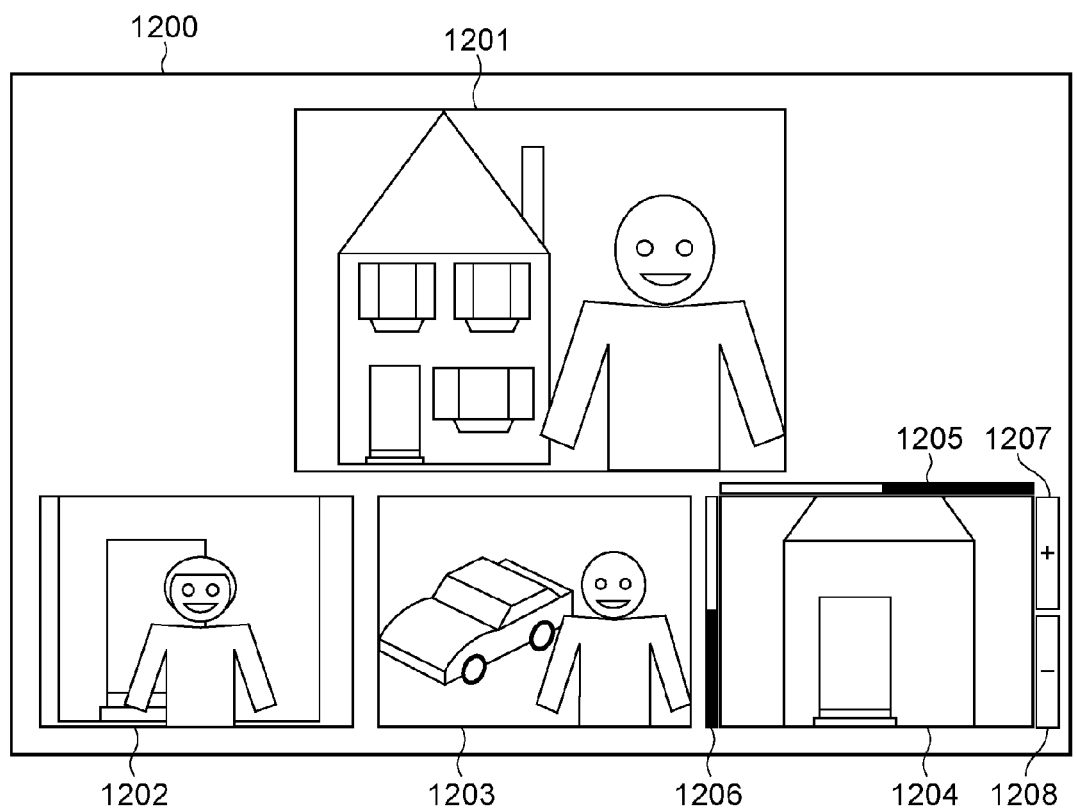
FIG. 12 is a diagram illustrating an image layout that has been subjected to the similarity elimination processing.

FIG. 12 is a diagram illustrating an image layout 1200 that has been subjected to the similarity elimination processing. Images 1201, 1202, 1203, and 1204 included in the image layout 1200 correspond to the images 901, 902, 903, and 904 illustrated in FIG. 9, respectively. The image 1204 is obtained by performing cropping upon the image 904 so that a house, which is a subject, is located at the center. Slide bars 1205 and 1206 are configured to display the current display position of the image 1204 that is an enlarged image and to receive a display position change instruction from the input unit 207. An enlargement button 1207 and a reduction button 1208 are configured to receive an instruction for changing the scaling factor of the image 1204 so as to allow a user to enlarge and reduce the image 1204, respectively.

Thus, according to the second embodiment, it is possible to prevent an image print and/or an image view from being visually monotonous using any template by determining a similarity between images, processing both or either of these images, and eliminating the similarity between these images. Furthermore, according to the second embodiment, it is possible to create an image print and/or an image view in which a person who is an important subject remains by excluding a set of images that have been determined to include the same person as the same subject from the sets of images stored in the data memory 203.

A third embodiment of the present invention will be described below. The process performed by an image layout apparatus according to the third embodiment is the same as that performed by an image layout apparatus according to the first embodiment which is illustrated in FIG. 4 except for the similarity determination/elimination processing performed in step S401 and the similarity eliminated image control processing performed in step S402.

Figure 13:
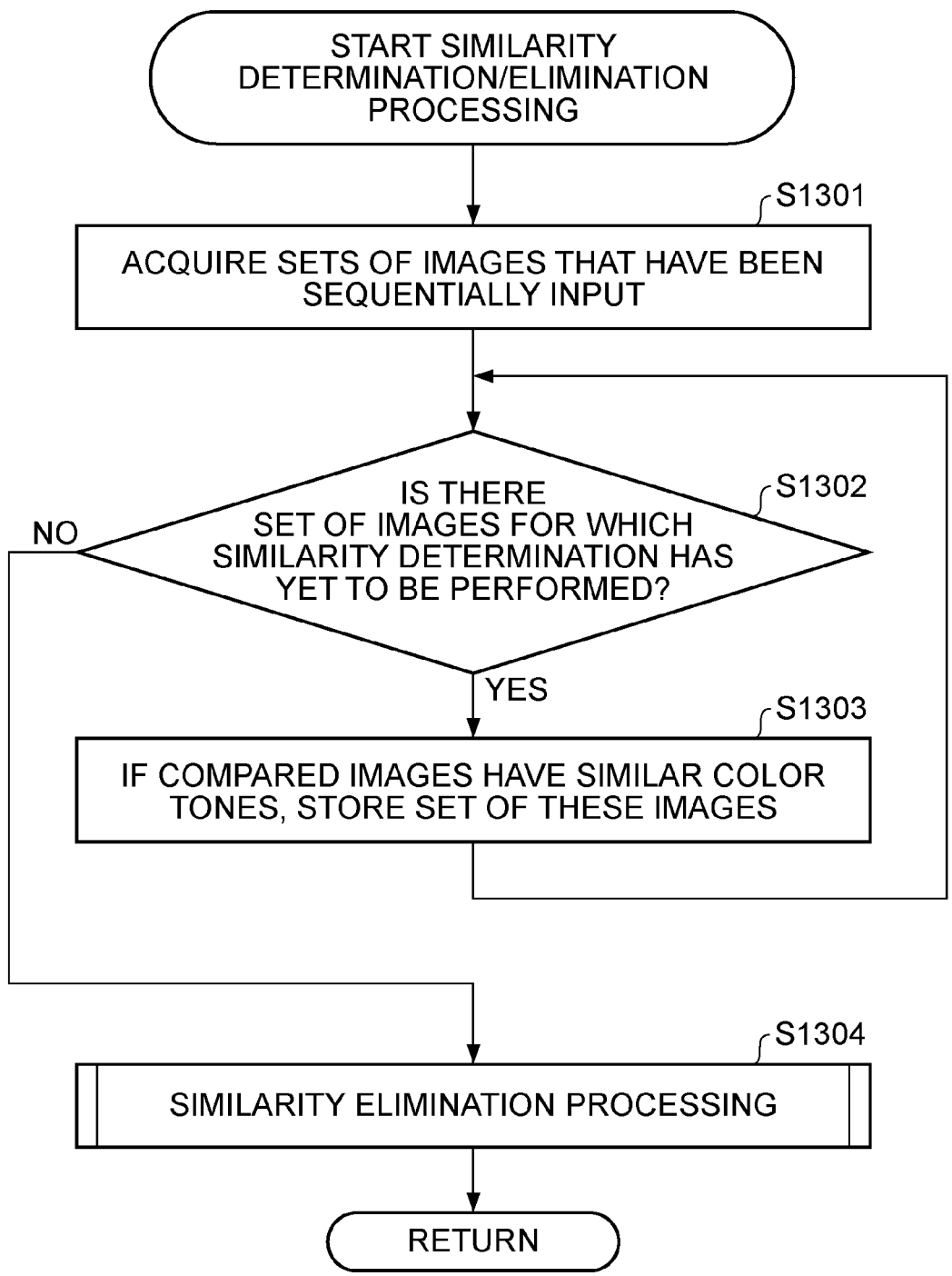
FIG. 13 is a flowchart illustrating details of the similarity determination/elimination processing according to a third embodiment.

Details of the similarity determination/elimination processing performed in step S401 will be described with reference to a flowchart illustrated in FIG. 13. FIG. 13 is a (third) flowchart illustrating the details of the similarity determination/elimination processing performed in step S401, but with reference to a third embodiment. In step S1301, the similarity determination unit 101 selects images that have been sequentially input as images to be compared with each other. Alternatively, the similarity determination unit 101 may select images that have not been sequentially input or images having the same attribute value as images to be compared with each other.

In step S1302, the similarity determination unit 101 determines whether there is a set of images for which similarity determination has yet to be performed among the selected sets of images. If there is a set of images for which similarity determination has yet to be performed in step S1302, the process proceeds to step S1303. If there is no set of images for which similarity determination has yet to be performed in step S1302, the process proceeds to step S1304. In step S1303, the similarity determination unit 101 compares images included in the selected set of images with each other. If these images (similarity determination target images) have similar color tones, the similarity determination unit 101 stores the set of these images in the data memory 203. Subsequently, the process returns to step S1302. For example, as a result of the comparison of the two similarity determination target images, if an error between the color tones of these images is within a predetermined color tone error, the similarity determination unit 101 determines that these images have similar color tones. In step S1304, the similarity elimination unit 102 performs similarity elimination processing upon each of the sets of images stored in the data memory 203 in step S1303.

Figure 14:
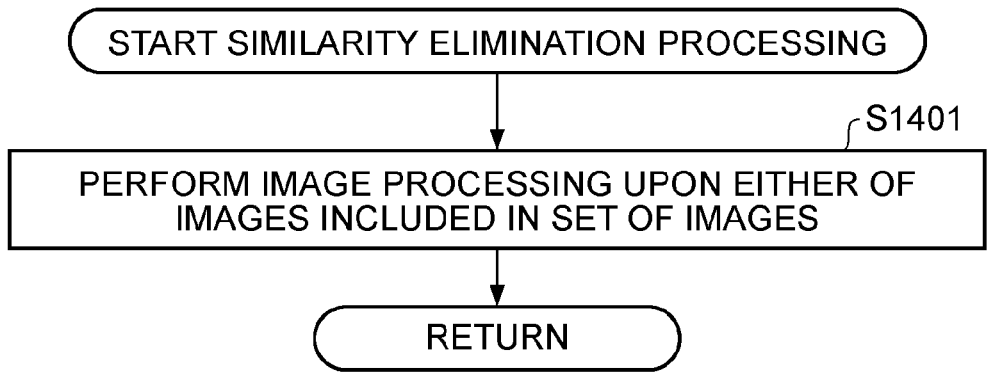
FIG. 14 is a flowchart illustrating details of similarity elimination processing.

Next, details of the similarity elimination processing performed in step S1304 will be described with reference to a flowchart illustrated in FIG. 14. FIG. 14 is a flowchart illustrating the details of the similarity elimination processing performed in step S1304. In step S1401, the similarity elimination unit 102 performs image processing upon either of images included in each of the sets of images stored in the data memory 203 so as to prevent these images from having similar color tones. Alternatively, the similarity elimination unit 102 may display either of images having similar color tones included in each of the sets of images stored in the data memory 203 instead of performing image processing upon either of images included in each of the sets of images stored in the data memory 203.

Figure 15:
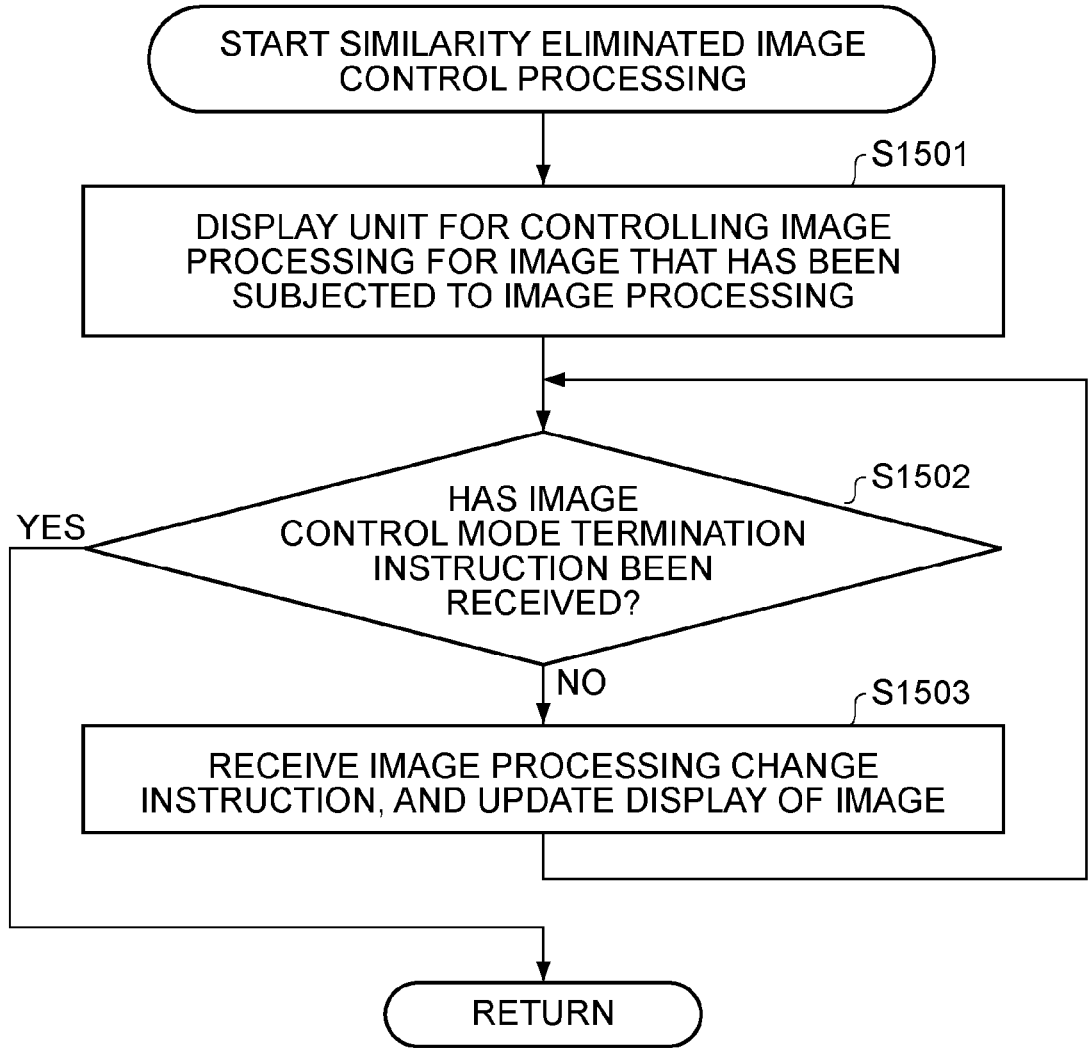
FIG. 15 is a flowchart illustrating details of the similarity eliminated image control processing according to a second embodiment.

Next, details of the similarity eliminated image control processing performed in step S402 will be described with reference to a flowchart illustrated in FIG. 15. FIG. 15 is a (second) flowchart illustrating the details of the similarity eliminated image control processing performed in step S402, but with reference to a second embodiment (associated with the third embodiment described above with respect to FIG. 13). In step S1501, the similarity eliminated image control unit 103 enters an image control mode in which image processing control units for controlling image processing for an image that has been subjected to image processing in the similarity elimination processing are displayed. If cropping is performed in step S1401 illustrated in FIG. 14, the similarity eliminated image control unit 103 displays a unit for receiving an image display position change instruction and a unit for receiving an image scaling factor change instruction. If the color tone of an image is changed in step S1401 illustrated in FIG. 14, the similarity eliminated image control unit 103 displays a unit for receiving a color tone change instruction.

In step S1502, if the similarity eliminated image control unit 103 receives an image control mode termination instruction, the process ends. On the other hand, in step S1502, if the similarity eliminated image control unit 103 does not receive the image control mode termination instruction, the process proceeds to step S1503. In step S1503, the similarity eliminated image control unit 103 receives from the input unit 207 an instruction input by the unit for controlling image processing, and updates the display of an image. Subsequently, the process returns to step S1502.

Thus, according to the third embodiment, it is possible to prevent an image print and/or an image view from being visually monotonous by determining a similarity between images on the basis of the color tones of these images, processing both or either of these images, and eliminating the similarity between these images.

The functions of the above-described embodiments can be achieved as follows. That is, a storage medium (or recording medium) recording the program code of software capable of achieving the functions of the above-described embodiments is provided for a system or an apparatus. The computer (CPU or MPU) of the system or apparatus reads out the program code from the storage medium and executes the read program code. In this case, the program code itself read out from the storage medium achieves the functions of the above-described embodiments. Accordingly, the present invention can be applied to the storage medium recording the program code.

An OS (Operating System) or the like running on the system or apparatus may perform a part of or all of the processing in response to the instructions of the program code that has been read out and executed by the computer of the system or apparatus.

Furthermore, the program code read out from the storage medium may be written in the memory of a function expansion card inserted into the system or apparatus or a function expansion unit connected to the system or apparatus. In this case, a CPU included in the function expansion card or the function expansion unit may perform a part of or all of the processing in response to the instructions of the program code so as to achieve the functions of the above-described embodiments.

If the present invention is applied to the above-described storage medium, program codes corresponding to the above-described flowcharts are stored in the (computer-readable) storage medium.

As described previously, according to the above-described embodiments, it is possible to prevent an image print and/or an image view from being visually monotonous.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions included in the scope of the claims.

This application claims the benefit of Japanese Patent Application No. 2008-178404 filed Jul. 8, 2008, which is hereby incorporated by reference herein in its entirety.

What is claimed is:

1. An image processing apparatus comprising:
a determination unit configured to determine whether there is a similarity between images; and
an image processing unit configured to edit at least one of the images according to the similarity between the images which has been determined by the determination unit,
wherein, in a case where the determination unit detects a same subject having a similar size at a similar position in the images, the determination unit is configured to determine that there is a similarity between the images, and
wherein, in a case where the images between which a similarity has been detected are moving images, the image processing unit is configured to eliminate the similarity between the similarity determination target images by shifting at least one displayed frame of the moving images.

2. The image processing apparatus according to claim 1, wherein the determination unit is arranged to set images that have been sequentially input into the image processing apparatus as the similarity determination target images.

3. The image processing apparatus according to claim 1, wherein the determination unit is arranged to set images arranged at specific positions as the similarity determination target images.

4. The image processing apparatus according to claim 1, wherein the image processing unit is configured to edit for eliminating the similarity between the similarity determination target images in which the same subject having a similar size have been detected at a similar position by cropping at least one of the similarity determination target images.

5. An image processing apparatus comprising:
a determination unit configured to determine frame groups including a same subject having a similar size at a similar position in moving images;
a selection unit configured to, in a case where the determination unit determines frame groups including the same subject having the similar size at the similar position, select a frame in the moving images which does not include the same subject having the similar size at the similar position by shifting at least one frame of the moving images; and
a display control unit configured to display at least any one frame in the frame groups and a frame selected by the selection unit.

6. The image processing apparatus according to claim 1, wherein, in a case where a plurality of sets of similarity determination target images in which the same subject has been detected includes a set of similarity determination target images including a predetermined specific subject as the same subject, the determination unit is configured to exclude the set of similarity determination target images including the predetermined specific subject from the plurality of sets of the similarity determination target images.

7. The image processing apparatus according to claim 5, wherein, the determination unit is further configured to determine frame groups have similar color tones, and wherein the selection unit is further configured to, in a case where the determination unit determines frame groups have similar color tones, select a frame in the moving images which does not have the similar color tones.

8. The image processing apparatus according to claim 1, wherein the image processing unit is configured to edit for eliminating the similarity between the similarity determination target images having similar color tones by changing at least one of the color tones of the similarity determination target images.

9. An image processing method comprising:
determining frame groups including a same subject having a similar size at a similar position in moving images;
selecting, in a case where the determining determines frame groups including the same subject having the similar size at the similar position, selecting a frame in the moving images which does not include the same subject having the similar size at the similar position by shifting at least one frame of the moving images; and
displaying at least any one frame in the frame groups and a frame selected by the selecting.

10. A non-transitory computer-readable storage medium storing a computer-executable program of instructions for causing a computer to perform a method comprising:

determining frame groups including a same subject having a similar size at a similar position in moving images;

selecting, in a case where the determining determines frame groups including the same subject having the similar size at the similar position, selecting a frame in the moving images which does not include the same subject having the similar size at the similar position by shifting at least one frame of the moving images; and displaying at least any one frame in the frame groups and a frame selected by the selecting.

11. The method according to claim 9, wherein the selected frame is arranged in an arrangement frame.

12. The method according to claim 9, wherein an album is generated using the selected frame.

13. The method according to claim 9, wherein the selected frame is cropped and displayed.

14. The non-transitory computer-readable storage medium according to claim 10, wherein the selected frame is arranged in an arrangement frame.

15. The non-transitory computer-readable storage medium according to claim 10, wherein an album is generated using the selected frame.

16. The non-transitory computer-readable storage medium according to claim 10, wherein the selected frame is cropped and displayed.

17. The image processing apparatus according to claim 5, wherein, in a case where the same subject is a person, the determination unit is configured to detect a face of the person.

18. The image processing apparatus according to claim 5, further comprising:

an arrangement unit configured to arrange the frame selected by the selection unit in an arrangement frame of a template in which the arrangement frame is defined.

19. The image processing apparatus according to claim 5, further comprising;

a generation unit configured to generate an album using the frame selected by the selection unit.

20. The image processing apparatus according to claim 5, wherein the image processing apparatus is configured to execute processing to generate a print medium using the frame selected by the selection unit.

21. The image processing apparatus according to claim 5, wherein the display control unit is configured to crop and display the frame selected by the selection unit.

* * * * *